United States Patent [19]
Okamoto

[11] Patent Number: 5,463,542
[45] Date of Patent: Oct. 31, 1995

[54] DC/DC CONVERTER AND RS-232 INTERFACE CIRCUIT USING THE SAME

[75] Inventor: Kouhei Okamoto, Tokyo, Japan

[73] Assignee: NEC Corporation, Tokyo, Japan

[21] Appl. No.: 383,685

[22] Filed: Feb. 1, 1995

Related U.S. Application Data

[63] Continuation of Ser. No. 31,900, Mar. 16, 1993, abandoned.

[30] Foreign Application Priority Data

Mar. 17, 1992 [JP] Japan ..................... 4-060587

[51] Int. Cl.⁶ ........................................... H02M 3/18
[52] U.S. Cl. ............................... 363/60; 307/110
[58] Field of Search ................. 363/59, 60; 307/110; 320/1

[56] References Cited

U.S. PATENT DOCUMENTS

| | | | |
|---|---|---|---|
| 4,199,806 | 4/1980 | Patterson, III | 363/59 |
| 4,999,761 | 3/1991 | Bingham et al. | 363/60 |
| 5,095,223 | 3/1992 | Thomas | 363/60 X |
| 5,159,543 | 10/1992 | Yamawaki | 363/60 |

OTHER PUBLICATIONS

NEC Corporation brochure, pp. 1206–1218, 1992.

*Primary Examiner*—A. D. Pellinen
*Assistant Examiner*—Y. Jessica Han
*Attorney, Agent, or Firm*—Popham, Haik, Schnobrich & Kaufman, Ltd.

[57] ABSTRACT

There is provided a circuit for achieving a serial communication at the standard voltage defined in the RS-232 interface communication standard when the signal processing voltage of the host side circuit is 5 V and 3 V, for example, in which, when the DC input voltage $V_{in}$ of the host side circuit is changed, this voltage level is detected to generate a stepped-up voltage having an appropriate step-up ratio by step-up circuits. This voltage level is detected to, regardless of the change of the power supply voltage, obtain the positive and negative DC output voltages Vdd, Vss matching with the RS-232 interface communication standard. To be specific, with the 5 V operation, a double stepped-up voltage within the DC/DC converter circuit and, during the 3 V operation, a three times stepped-up voltage are selectively generated to obtain the DC output voltage.

3 Claims, 3 Drawing Sheets

DC/DC CONVERTER AND RS-232 INTERFACE CIRCUIT USING THE SAME

This is a continuation of U.S. patent application Ser. No. 08/031,900, filed Mar. 16, 1993, now abandoned.

BACKGROUND OF THE INVENTION

The present invention relates to an RS-232 serial interface circuit for transmitting and receiving serial data and, more particularly, to an interface circuit including a DC/DC converter circuit which generates positive and negative voltages through a single power supply.

Conventional DC/DC converter circuits, which are constituted as the power supply within an interface circuit of a single power supply system, have consisted mainly of a charge pump system which generates stepped-up positive and negative voltages by switching the charging/discharging timing of a capacitor.

FIG. 1 illustrates a typical arrangement of a conventional DC/DC converter circuit of charge pump system, which comprises: a transmitting circuit OSC for generating a clock signal as a switching signal; an inverter INV for inverting the switching signal generated by the transmitting circuit OSC; an input terminal IN connected to power supply (not shown); a positive and negative output terminals OUT1, OUT2; a charge pumping capacitor C1, a step-up charging capacitor C3 and transistor switches T1, T2, T5 and T6, which constitute a step-up circuit for stepping-up the input voltage; capacitors C2, C4 for stepping-up the positive and negative voltages; and transistor switches T3, T4, T7, T8 constituting a polarity inverting circuit.

In operation of the DC/DC converter circuit illustrated in FIG. 1, when a communication start signal is entered from the outside system, transmitting circuit OSC generates a clock signal which is directly supplied as the switching signal to a first group of the transistor switches T1 to T4, and also supplied, after inverted by the inverter INV, to switch on/off a second group of the transistor switches T5 to T8.

In this ON/OFF timing, the first group of transistor switches T1 to T4 and the second group of the transistor switches T5 to T8 are switched ON and OFF simultaneously but in the opposite timing to each other.

When the second group of transistor switches T5 to T8 are switched ON, the charge pump capacitor C1 of the step-up circuit is turned to the charging mode. When, in the next cycle, the first group of transistor switches T1 to T4 are switched ON, the T5 to T8 are switched OFF, and the charge pump capacitor C1 is turned into the discharging mode, and the charging capacitors C3, C4 are electrically charged at a positive voltage Vdd resulting from stepping-up the input voltage $V_{in}$. Subsequently, if, in the next cycle, T1 to T4 are switched OFF and T5 to T8 are switched ON, the charge pump capacitor C1 is turned into the charging mode, and the charging capacitor C2 of the polarity inverting circuit generates the negative voltage Vss in which the charging voltage Vdd of C4 is inverted in polarity. In this manner, the positive and negative output voltages Vdd, Vss resulting from stepping-up the input voltage Vin are continuously obtained from the DC/DC converter circuit.

Under normal conditions, where the single input DC voltage $V_{in}$ of the DC/DC converter is set at +5 V, a double voltage +10 V is electrically charged into the charging capacitor C3 by the operation of the step-up circuit, and −10 V is electrically charged into the charging capacitor C2.

The ±10 V output DC voltages Vdd and Vss resulting from the aforementioned operations are each supplied as the driving voltage to the transmitting circuit (not shown) for transmitting and receiving serial communication data to and from the output terminals OUT1, OUT2.

When such a DC/DC converter circuit is used as a terminal apparatus, in order to lower the power consumption of the set, a clock of the transmitting circuit OSC is stopped during the non-communication time to stop the operation of the DC/DC converter circuit.

In the hand-held data terminal apparatues such as personal computers or word processors, which are based on being driven by battery, in order to achieve a reduction in power consumption, in other words, the miniaturization and lightening of the apparatus through the reduction of the number of loaded batteries, the driving voltage of the signal system attempted have been made to reduce from the conventional 5 V to about 3 V.

However, the reduction of the voltage involves a reduction of the processing speed of the CPU or memory which constitutes the RS-232 interface circuit and, in particular, the reduction in the access time when the data terminal apparatus is driven, thus impeding the realization of the reduction in the voltage to about 3 V.

Therefore, during driving, if the CPU or memory calls for a high speed processing, then the driving voltage is set to 5 V and, if a slow processing speed is sufficient, it is switched to about 3 V to achieve the reduction in the power consumption.

However, in the DC/DC converter circuit used in the serial interface circuits such as a conventional RS-232 interface circuit or the like, in order to achieve the driving system switching of the above-described driving voltage, a circuit system in which the step-up ratio is fixed is adopted to step-up the driving voltage to twice or three times. As a result, a problem can arise which causes the output DC voltage obtained for the output of the DC/DC converter circuit to differ with the driving voltage (input DC voltage).

In general, the output voltage at the transmitting side, which is defined in the RS-232 interface communication standard, is defined to ±5 V at most. When a DC/DC converter circuit having the double step-up ratio is used, if the driving voltage (input DC voltage) is 3 V, then the aforementioned ±5 V output voltage cannot be assured due to the effect caused by the temperature characteristic or the load characteristic considering the load of the serial interface circuit.

Therefore, during driving at 3 V, a DC/DC converter having the three times step-up ratio becomes necessary. On the other hand, during driving at 5 V, the DC/DC converter circuit having the double step-up ratio is sufficient to assure the foregoing ±5 V output voltage. Further, since the step-up ratio is approximately proportional to the power consumption of the DC/DC converter circuit, in order to achieve the intended reduction in the power consumption, the double step-up ratio DC/DC converter circuit becomes necessary.

However, the step-up ratio of the DC/DC converter circuit of the conventional RS-232 interface circuit is constant, which makes it impossible to solve the trade-off problem of both assuring the ±5 V output voltage or decreasing the power consumption.

SUMMARY OF THE INVENTION

A primary object of the present invention is to provide a DC/DC converter circuit which allows the power consumption to be reduced by changing the step-up ratio of the DC/DC converter circuit in the power supply of the driving voltage in the host side circuit, while generating the transmitting side output voltage defined by the RS-232 interface communication standard.

Another object of the present invention is to provide an RS-232 interface circuit including a transmitting/receiving circuit operating with the DC/DC converted circuit as the power supply.

The present invention relates to a DC/DC converter circuit which allows the output DC voltage stepped-up in both the positive and negative sides to be obtained from the input DC voltage. The foregoing input DC voltage has two kinds of driving voltages.

The DC/DC converter circuit according to a first embodiment of the present invention has a feature that when the driving voltage for the host side circuit is switched to the two high and low voltages as the foregoing input DC voltage, the level of the driving voltage is detected to control the step-up ratio to generate the voltage matching with the RS-232 interface communication standard as the foregoing output DC voltage.

In a further aspect of the present invention, a DC/DC converter circuit comprises a comparator circuit for determining to which one of the foregoing two driving voltages the input DC voltage corresponds; a first step-up circuit having a first step-up ratio for stepping-up the input DC voltage with the first step-up ratio to generate a first stepped-up voltage; a second step-up circuit having a second step-up ratio different from the first step-up ratio for stepping-up the input DC voltage with the second step-up ratio to generate a second stepped-up voltage; and a selector means for selecting either one of the first and second stepped-up voltage depending on the result determined by the comparator circuit to generate the selected voltage as the output DC voltage.

In the DC/DC comparator circuit, the foregoing first step-up ratio is equal to, for example, the double step-up ratio, and the foregoing second step-up ratio is equal to, for example, the three times step-up ratio.

The RS-232 interface circuit according to the present invention includes a transmitting/receiving circuit operating with the foregoing second embodiment DC/DC converter circuit as the power supply.

In a further aspect of the present invention, a DC/DC converter circuit according to a third embodiment of the present invention comprises a first step-up circuit having a first step-up ratio for stepping-up the foregoing input DC voltage with the first step-up ratio to generate a first step-up voltage; a second step-up circuit having a second step-up ratio different from the first step-up ratio for stepping-up the input DC voltage with the second step-up ratio to generate a second stepped-up voltage; and a selector means for selecting either one of the first and second stepped-up voltages depending on a signal indicating to which one of the foregoing two kinds of driving voltages the foregoing input DC voltage corresponds, to generate the selected one as the foregoing output DC voltage.

In the DC/DC converter circuit according to the third embodiment, the foregoing first step-up ratio is equal to, for example, the double step-up ratio, and the foregoing step-up ratio is equal to, for example, the three times step-up ratio.

The RS-232 interface circuit according to the second embodiment of the present invention has a transmitting/receiving circuit operating with the third embodiment DC/DC converter circuit as the power supply.

That is, although the DC/DC converter circuit used in the conventional RS-232 interface circuit steps-up the single input level with a predetermined step-up ratio to use the positive/negative DC output voltage for the transmitting power supply for the serial interface circuit, in the present invention, since the step-up ratio of the DC/DC converter circuit as the power supply is changed to twice or three times by the driving voltage of the host side circuit to provide the transmitting side output voltage defined in the RS-232 interface communication standard so that, during 5 V operation which requires the processing speed of the signal, the step-up ratio can be reduced from three times to twice. It is therefor possible to provide an RS-232 interface circuit which allows the power consumption of the data terminal apparatus to be reduced.

The present invention will become apparent form the following detailed description with reference to the accompanying drawings.

DESCRIPTION OF THE PREFERRED EMBODIMENTS

Figure 1:
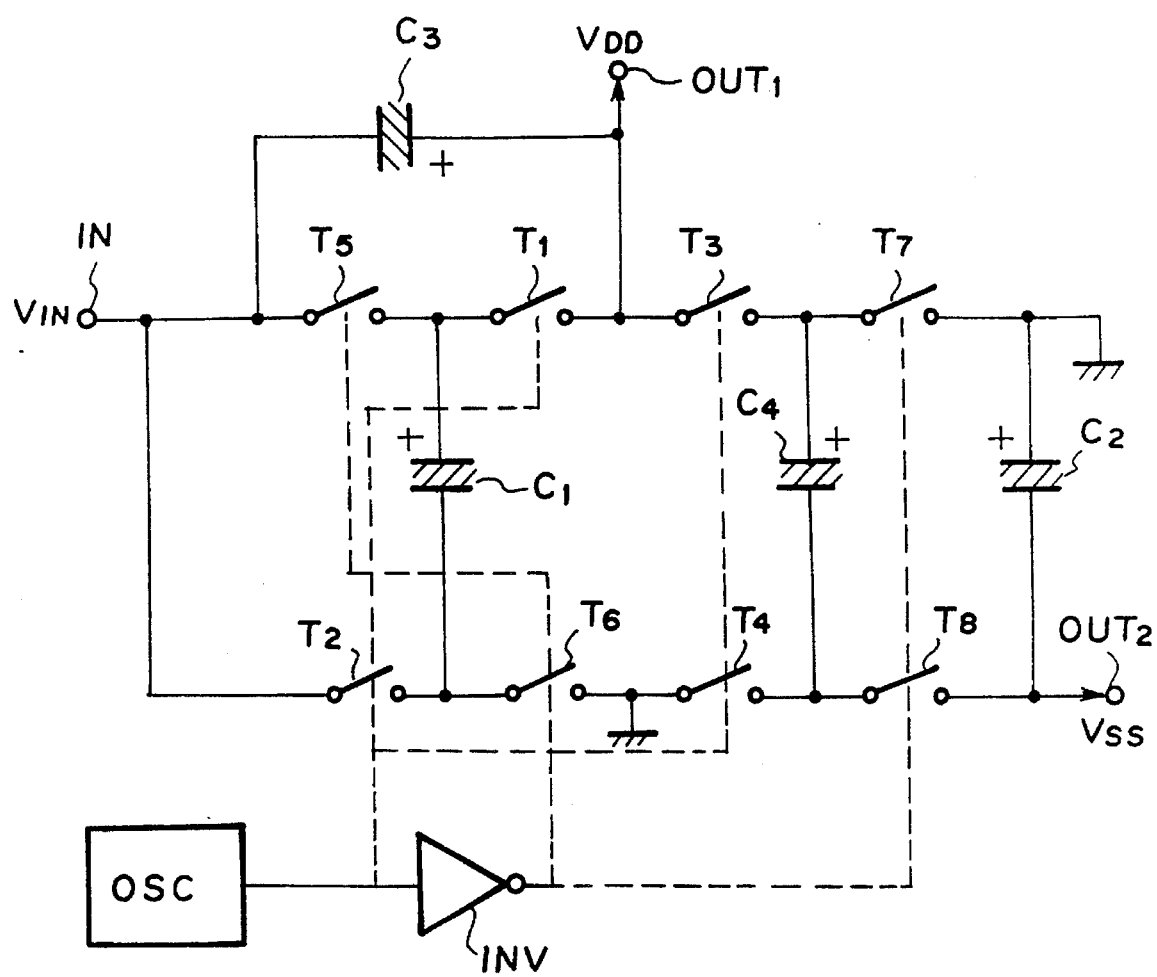
FIG. 1 is a block diagram illustrating a DC/DC converter of a conventional RS-232 interface circuit.
Figure 2:
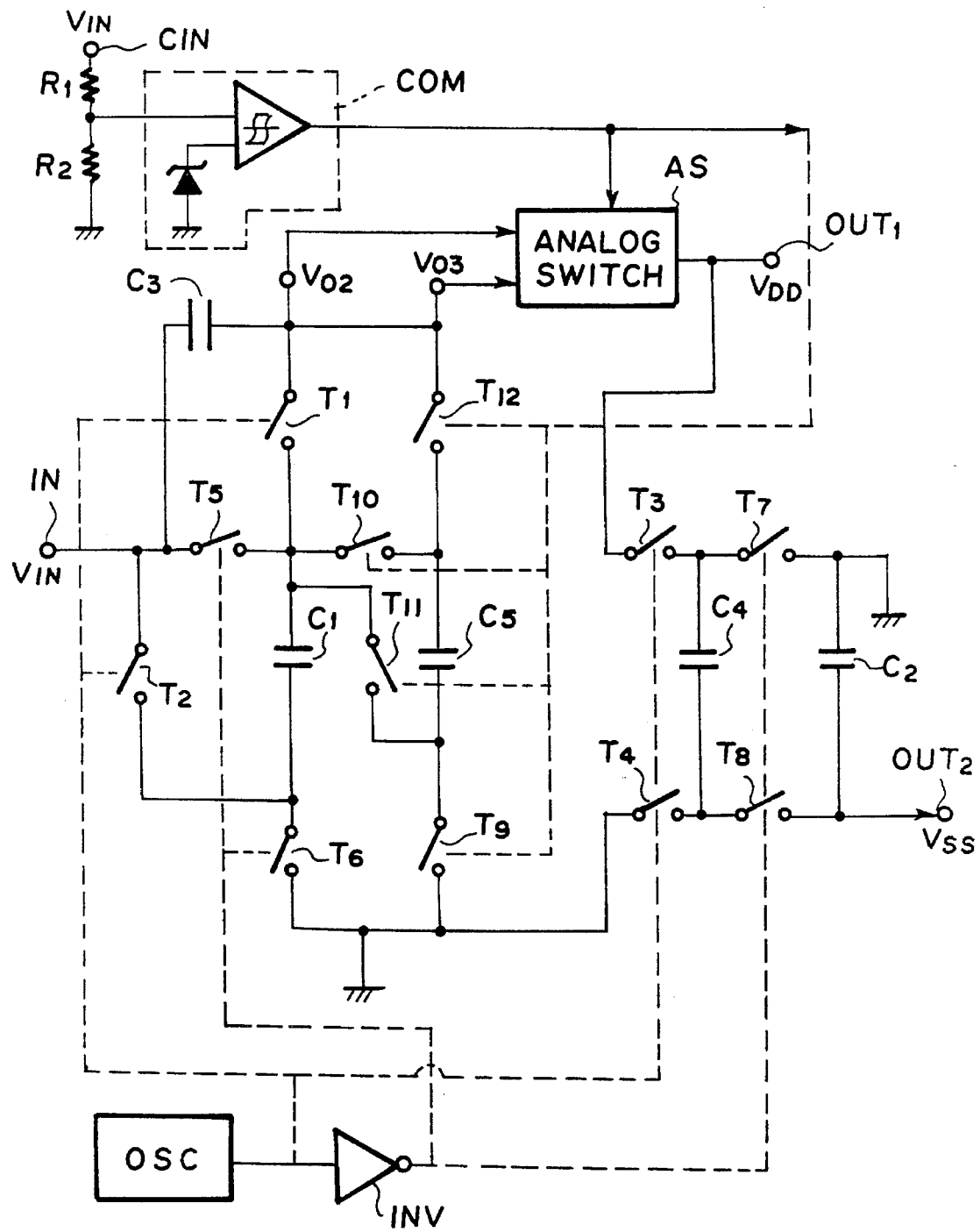
FIG. 2 is a block diagram illustrating a DC/DC converter of an RS-232 interface circuit embodying the present invention.

FIG. 2 illustrates a DC/DC converter of an RS-232 interface circuit embodying the present invention, which comprises a transmitting circuit OSC for generating a clock signal as a switching signal; an inverter INV for inverting the switching signal generated by the transmitting circuit OSC; an input terminal IN connected to a power supply (not shown); a positive and negative output terminals OUT1, OUT2; a charge pumping capacitor C1, a step-up charging capacitor C3 and transistor switches T1, T2, T5 and T6, which constitute a step-up circuit for stepping-up the input voltage; capacitors C2, C4 for stepping-up the positive and negative voltages; and transistor switches T3, T4, T7, T8 constituting a polarity inverting circuit. The connection and function of the elements set forth above are substantially same as those illustrated in FIG. 1.

The RS-232 interface circuit embodying the present invention further comprises a second circuit having a step-up ratio of three times comprising transistor switches T9, T10, T11, T12 for adjusting timing, an analog switch AS for selecting either one of the output voltages $V_{o2}$, $V_{o3}$ whose step-up ratios are each double and three times, a comparator COM for ascertaining the DC input voltage $V_{in}$, an input terminal CIN of the comparator COM and a voltage divider comprising resistances R1, R2 for determining the DC input voltage $V_{in}$ entered to the CIN.

In order to generate the DC voltage having the three times step-up ratio from the circuit illustrated in FIG. 2, the switching timing of the transistor switches T9, T10 are made synchronous with that of T5 to T8, and the switching timing of T11, T12 is made synchronous with that of T1 to T4 to add the DC input voltage $V_{in}$ charged into the second charge pump capacitor C5 to the charged value of the charging capacitors C3, C4.

On the other hand, the input DC voltage $V_{in}$ is also supplied to the input terminal CIN of the comparator COM. The comparator COM functions to compare the voltage obtained by dividing the input DC voltage by the voltage divider comprising R1, R2 with the preset reference voltage to determine whether the DC input voltage $V_{in}$ is on the high or 5 V level or on the low or 3 V level. In this case, when the resistances R1, R2 are set to the same resistance value connected in series between the input terminal CIN of the comparator COM and the grounding point, then, when 5 V is entered as the DC input voltage $V_{in}$, the input voltage of the comparator COM is 2.5 V and when 3 V is entered, the input voltage is 1.5 V.

Here, if the reference voltage level of the comparator COM is set to 2.0 V, then the driving voltage level of the signal system can be determined by the comparator COM.

In cases where that the analog switch AS selects either one of the double step-up voltage $V_{02}$ or the three times step-up voltage $V_{03}$ entered thereto in accordance with the foregoing determined result to generate to the power supply output terminal OUT1, the output DC voltage $V_{DD}$ corresponding to the DC input voltage $V_{in}$ can be obtained as the output voltage of the DC/DC converter circuit.

Finally, when the polarity of the output DC voltage VDD of the power supply output terminal OUT1, which is obtained from the foregoing operation, is inverted by the polarity inverting circuit comprising transistors T3, T4, T7, T8 and capacitors C2, C4, the output DC voltage VSS different in polarity from the output DC voltage $V_{DD}$ can be obtained at the power supply terminal OUT2.

Furthermore, in the converter of present invention, when the DC input voltage $V_{in}$ is 5 V, the power consumption can be reduced by stopping the operation of the three times step-up circuit of the DC/DC converter circuit. That is, it can be achieved by stopping the operation of the transistor switches T9 to T12 by the output signal of the comparator COM after 5 V is ascertained by the comparator COM.

Figure 3:
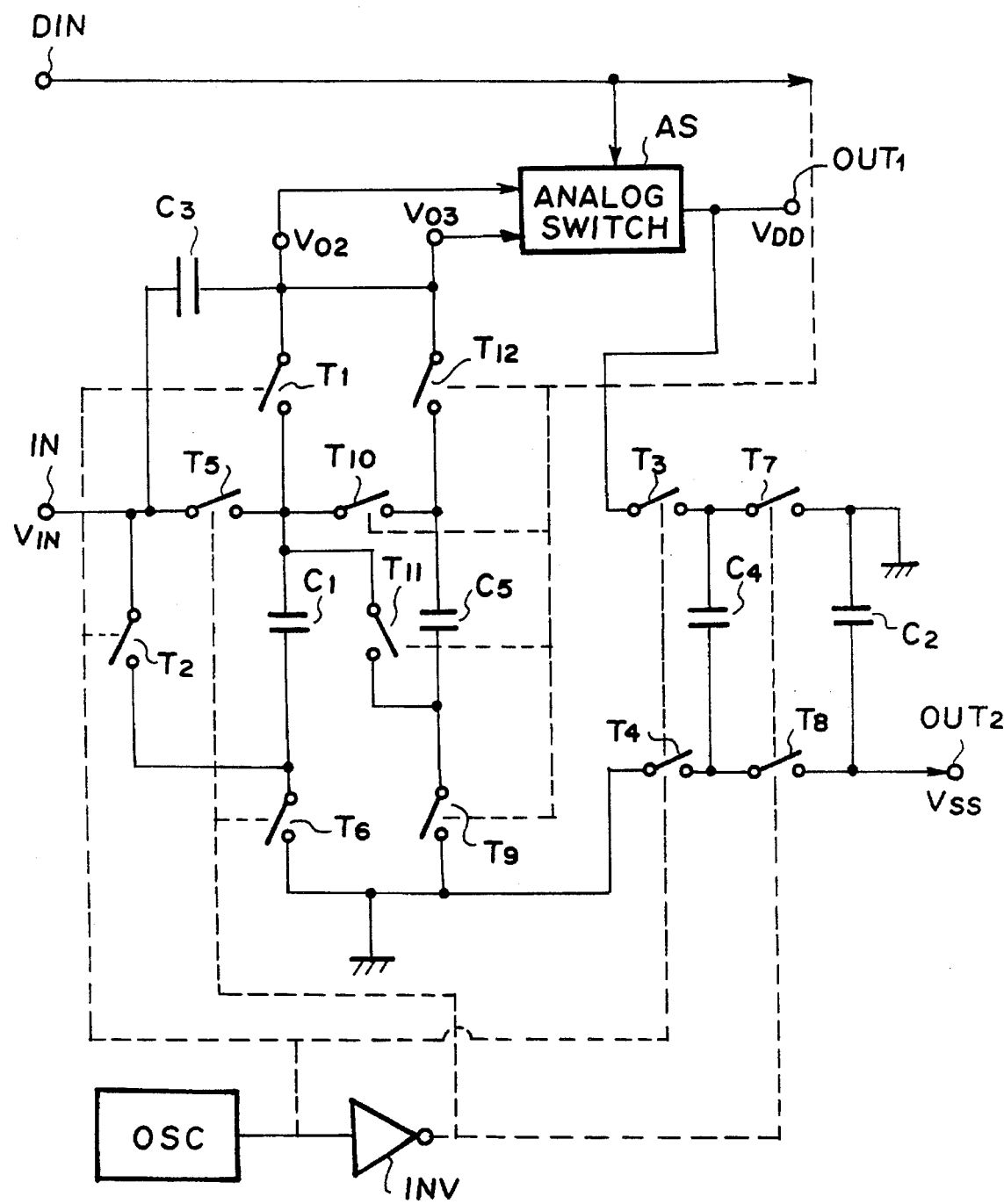
FIG. 3 is a block diagram illustrating another DC/DC converter of the RS-232 interface circuit embodying the present invention.

FIG. 3 illustrates a further power supply circuit portion or DC/DC converter circuit of the RS-232 interface circuit embodying the present invention.

The DC/DC converter circuit illustrated in FIG. 3 differs from those showing FIG. 2 in that the function to automatically determine the DC input voltage by the comparator COM is omitted.

That is, in the embodiment of FIG. 3, in place of the DC input voltage $V_{in}$, the digital signal generated according to the driving voltage of the signal system of the host side circuit (not shown) received by the driving voltage level input terminal DIN, and the digital signal is supplied as the selected signal to the analog switch AS to select either one of the double stepped-up voltage $V_{02}$ and the three times stepped-up voltage $V_{03}$ to generate the selected voltage to the power supply terminal OUT1 as the output DC voltage $V_{DD}$.

What is claimed is:

1. A DC/DC converter, comprising:

an input terminal supplied with an input voltage;

a first output terminal;

a reference terminal;

first, second, third, fourth and fifth nodes;

a first capacitor connected between said input terminal and said first node;

a second capacitor connected between second and third nodes;

a third capacitor connected between fourth and fifth nodes;

a first switch connected between said first and second nodes;

a second switch connected between said input terminal and said second node;

a third switch connected between said input terminal and said third node;

a fourth switch connected between said third node and said reference terminal;

a fifth switch connected between said first and fourth nodes;

a sixth switch connected between said second and fourth nodes;

a seventh switch connected between said second and fifth nodes:

an eighth switch connected between said fifth node and said reference terminal;

a control node supplied with a control signal which takes a first logic state in a first mode and a second logic state in a second mode;

means for operating in said first mode to control said first through eight switches such that a first voltage is produced at said first output terminal and in said second mode to control said first through eighth switches such that a second voltage is produced at said second output terminal, said first voltage assuming a first level which is two times as large as said input voltage and said second voltage assuming a second level which is three times as large as said input voltage means; and means for transferring said first voltage to said first output terminal in said first mode and said second voltage to said first output terminal in said second mode.

2. The converter as claimed in claim 1, further comprising:

a second output terminal;

sixth and seventh nodes;

a fourth capacitor connected between said second output terminal and said reference terminal;

a fifth capacitor connected between said sixth and seventh nodes;

a ninth switch connected between said first output terminal and said sixth node;

a tenth switch connected between said seventh node and said reference terminal;

an eleventh switch connected between said sixth node and said reference terminal; and a twelfth switch connected between said seventh node and said second output terminal, wherein said ninth through twelfth switches is controlled such that a third voltage is produced at said second output terminal in said first mode and a fifth voltage is produced at said second output terminal in said second mode, said third voltage having a level that is equal to said first voltage and a polarity that is opposite to said first voltage, and said fourth voltage having a level that is equal to said second voltage and a polarity that is opposite to said second voltage.

3. The converter as claimed in claim 2, wherein said control signal is produced by a comparator comparing said input voltage with a reference voltage, said control signal taking said first logic state when said input voltage is larger than said first reference voltage and said second logic state when said input voltage is not larger than said reference voltage.

* * * * *